Figure 1:
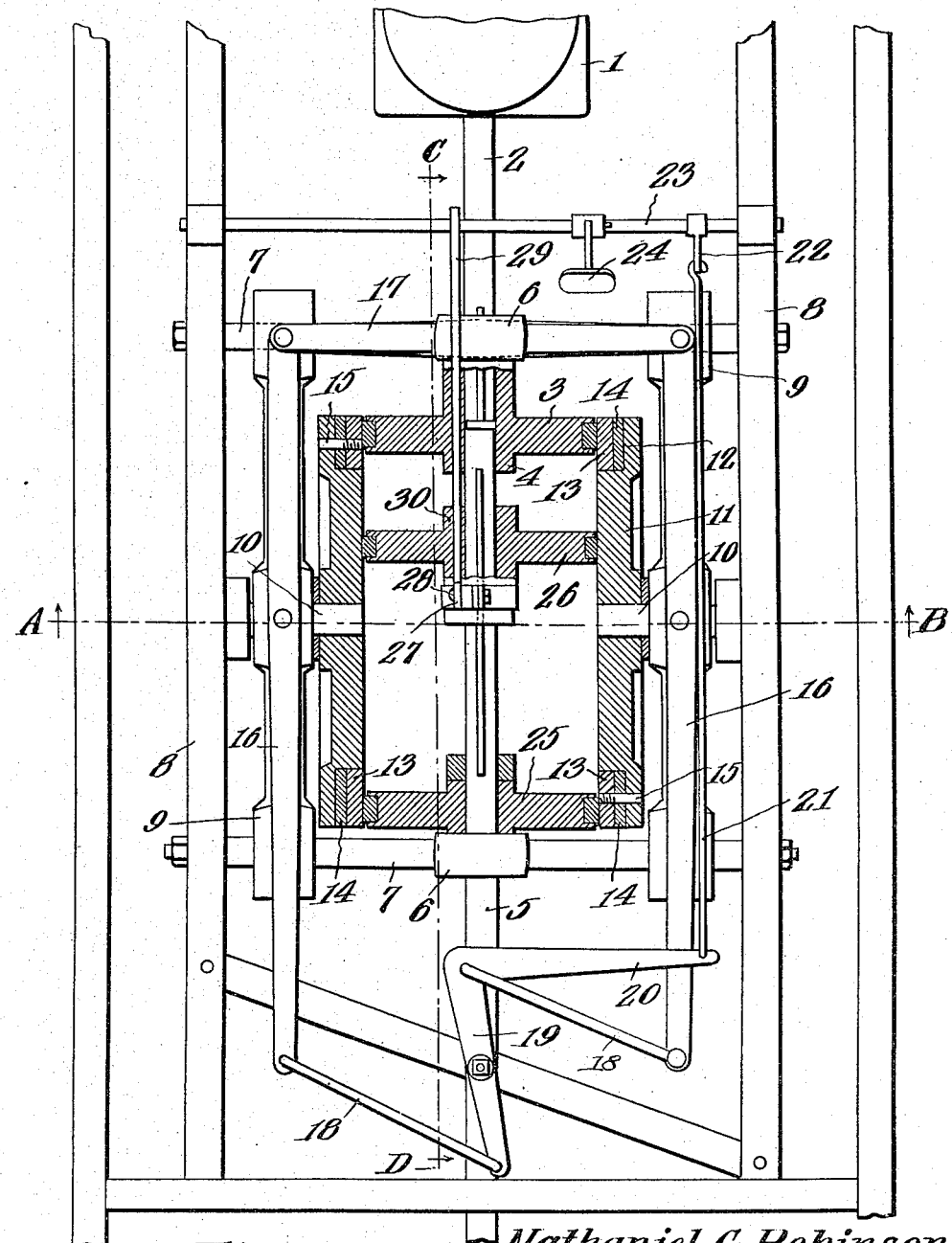

Nathaniel G. Robinson, Inventor

N. G. ROBINSON.
TRANSMISSION GEARING.
APPLICATION FILED JULY 27, 1914.
1,195,502.
Patented Aug. 22, 1916.
2 SHEETS—SHEET 2.
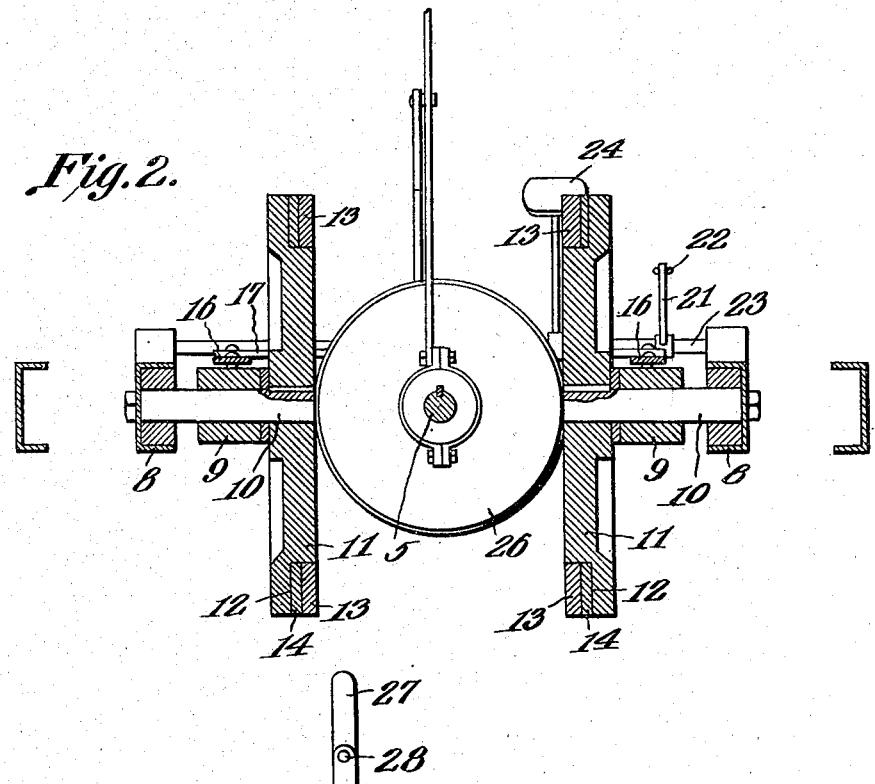
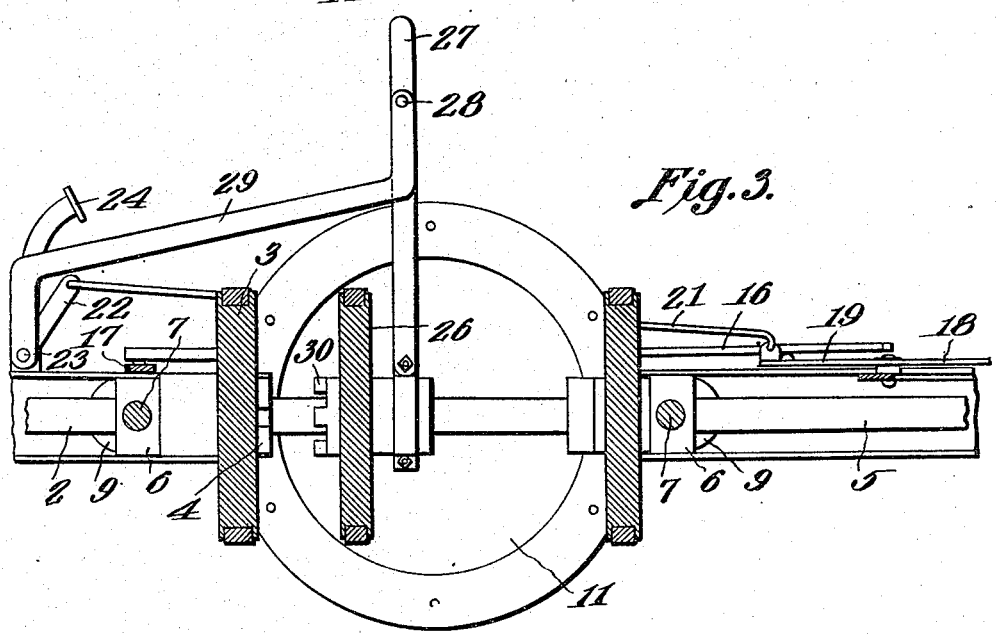
Witnesses
Nathaniel G. Robinson,
Inventor
by C. A. Snow & Co.
Attorneys

UNITED STATES PATENT OFFICE.

NATHANIEL GUY ROBINSON, OF WOOLSTOCK, IOWA, ASSIGNOR OF ONE-FOURTH TO MARTIN H. HIRT AND ONE-FOURTH TO ROBERT F. HIRT, BOTH OF WOOLSTOCK, IOWA.

TRANSMISSION-GEARING.

1,195,502.  Specification of Letters Patent.  Patented Aug. 22, 1916.

Application filed July 27, 1914. Serial No. 853,461.

*To all whom it may concern:*

Be it known that I, NATHANIEL G. ROBINSON, a citizen of the United States, residing at Woolstock, in the county of Wright and State of Iowa, have invented a new and useful Transmission-Gearing, of which the following is a specification.

This invention relates to transmission gearing and is more particularly designed as an improvement upon the structure disclosed in Patent No. 1,010,804, issued to me on December 5, 1911.

One of the objects of the invention is to provide friction transmission gearing utilizing means whereby the side friction disks are properly braced so as not to be shifted out of parallel relation during the transmission of power therethrough to the driven disk.

A further object is to provide means whereby the active surfaces of the side disks are free to yield, thus to compensate for any wear upon the disks which might otherwise render the gearing inefficient.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings: Figure 1 is a horizontal section through the gearing, adjacent parts being shown in plan. Fig. 2 is a section on line A—B Fig. 1. Fig. 3 is a section on line C—D Fig. 1.

Referring to the figures by characters of reference 1 designates a motor the shaft 2 of which has a drive disk 3 keyed or otherwise secured thereto so as to rotate therewith. This drive disk is provided with a clutch member 4.

A driven shaft 5 alines with the shaft 2 and projects loosely into the hub of the disk 3. Each of the shafts 2 and 5 is journaled within a bearing 6, the two bearings being connected by cross bars 7 to side frame members 8.

Side bars 9 are slidably mounted, adjacent their ends, upon the bars 7 and also upon shafts 10 which are journaled therein and within the side frame members 8. Keyed or otherwise secured to each of these shafts 10 is a side disk 11 provided, in its inner face at the periphery thereof, with an annular channel 12. Seated in this channel is a friction ring 13 and interposed between the friction ring and the disk 11 is a ring 14 of rubber or like material. These rings 13 and 14 are connected to the disk 11 by means of pins 15 secured to the ring 13 and extending through the ring 14 and loosely into the disk 11. Thus it will be seen that by pressing the rings 13 outwardly the rubber rings 14 will be placed under compression. These rubber rings operate as cushioning means, as will be obvious. The drive disk 3 constantly contacts with the two rings 13.

Pivotally mounted upon the middle portion of each of the side bars 9 is a lever 16. The two levers are connected at one end by a link 17. The other ends of the two levers are connected by links 18 to the ends of a centrally fulcrumed lever 19 and projecting from one end of this lever 19 is an arm 20 having a rod 21 extending therefrom to an arm 22. This arm 22 is extended radially from a cross shaft 23 adapted to be operated by a foot lever 24 or the like. The disks 11 are feathered on the shafts 10 so that, when shaft 23 is rotated, rod 21 will pull on arm 20 and thus cause lever 19 to pull through links 18 upon the levers 16. As these levers are both connected to the link 17, it will be apparent that they will, by reason of their connections with the side bars 9, cause said bars to move toward each other along the bars 7 and thus shift the disks 11 toward each other along the shafts 10 with which they rotate. Consequently said disks will bear tightly against the drive disks 3.

An idler disk 25 is loosely mounted on the driven shaft 5 and is interposed between the rings 13 at points diametrically opposite the disk 3. By providing the idler disk 25, the disks 11 are held against the periphery of the drive disk 3. In other words, the disks 3 and 25 coöperate to hold the inner or active faces of the disks 11 in parallel planes and to prevent vibration thereof while in operation.

Feathered on the shaft 5 is a driven disk 26 normally engaging the two disks 11 and adapted to be shifted past the centers of said disks so as to be given either clockwise or counter clockwise movement by the disks 11. This driven disk 26 can be shifted in any suitable manner, as by means of a foot lever 27 or the like fulcrumed, as at 28, upon a pivoted bar 29. The driven disk 26 has a clutch member 30 which is adapted to couple with the clutch member 4 when the disk 26 is shifted to one extreme position, thus to directly connect the shafts 2 and 5. As the disk 26 is shifted away from disk 3, it will engage the disks 11 at points nearer the centers or shafts 10 thereof, with the result that shaft 5 will be rotated at a lower speed than the drive shaft 2. When disk 26 is shifted past the centers of the disks 11, the rotation of the shaft 5 will be reversed, the speed of this reverse rotation increasing in proportion to the extent of travel of the disk 26 past the centers of the disks 11. Should the disks tend to slip during the transmission of power, the side disks 11 can be adjusted toward each other in the manner hereinbefore described so as to cause the rings 13 to bind more firmly upon the disks interposed therebetween, the rings 14 yielding at this time to permit of the proper engagement of all of the disks.

It will be seen that the gearing is very simple and efficient in view of the fact that the side disks can be adjusted readily toward each other by reason of the cushion rings carried thereby. Furthermore, by the utilization of the idler disk 25 disposed oppositely to the disk 3, the two side disks are always held true irrespective of the strains to which they may be subjected during the transmission of power from disk 3 to disk 26.

What is claimed is:—

1. Transmission gearing including side disks, cushioned bearing rings connected to the marginal portions of the disks and having their active faces normally flush with the active faces of the respective disks, a drive disk interposed between the rings, an idler disk interposed between said rings, said idler disk and drive disk engaging each of the rings at diametrically opposed points, a drive shaft mounted for rotation in the idler disk, and a driven disk secured to the shaft and shiftable diametrically along the side disks, said driven disk being interposed between the drive and idler disks and being out of contact with the rings.

2. Transmission gearing including side disks having annular channels, cushioned bearing rings secured in the channels and having their active faces normally flush with the active faces of the side disks, a drive disk interposed between and normally engaging the rings, an idler disk normally engaging said rings, the drive and idler disks being located at diametrically opposed points upon the rings, a driven shaft mounted for rotation in the idler disk, a driven disk on the driven shaft and interposed between and engaging the side disks, and out of contact with the rings, and means for synchronously moving the side disks toward or from each other to clamp upon the drive, driven and idler disks irrespective of variations in the diameters thereof.

In testimony that I claim the foregoing as my own, I have hereto affixed my signature in the presence of two witnesses.

NATHANIEL GUY ROBINSON.

Witnesses:
 D. H. HUFF,
 EMILE MALAISE.

Copies of this patent may be obtained for five cents each, by addressing the "Commissioner of Patents, Washington, D. C."